Figure 1:
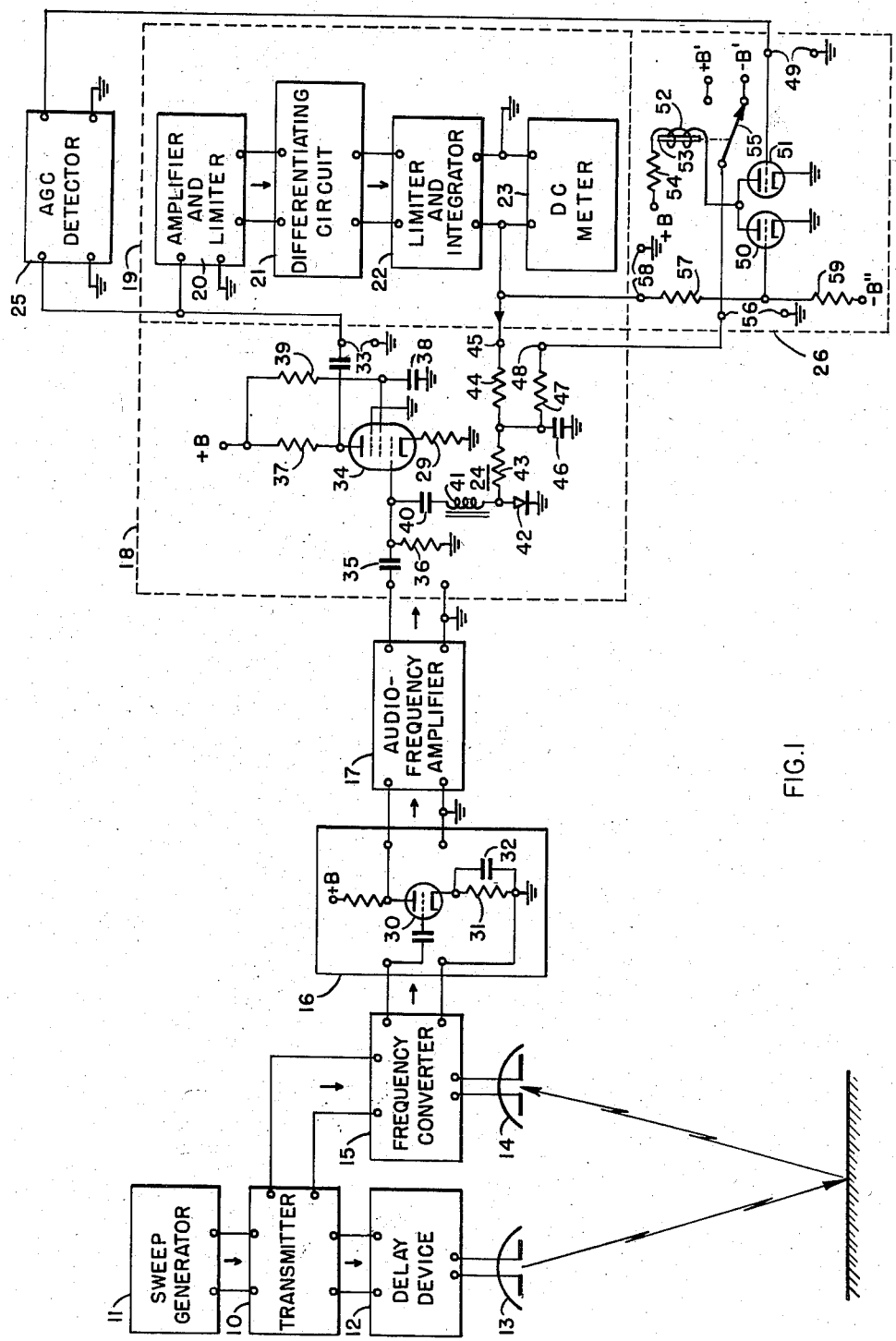

United States Patent Office 2,881,422
Patented Apr. 7, 1959

2,881,422
DISTANCE-MEASURING APPARATUS

William F. Vetter, Levittown, and Byron G. Wanty, Huntington, N.Y., assignors to Hazeltine Research, Inc., Chicago, Ill., a corporation of Illinois Application November 2, 1954, Serial No. 466,252

10 Claims. (Cl. 343—14)

GENERAL

The present invention is directed to distance-measuring apparatus and, more particularly, to apparatus employing frequency-modulated wave signals for determining the distance to an object. The apparatus has particular utility as an altimeter and, hence, will be described in that environment.

In a frequency-modulation altimeter, a wave signal which is recurrently swept over a range of frequencies is radiated or transmitted to the ground and in response thereto there is received by the altimeter a related frequency-modulated wave signal or echo. Because of the continuous change in frequency incurred by the sweeping operation and also because of the round-trip propagation time between the altimeter and ground, at a given instant the frequency of the received wave signal is different from that of the transmitted signal. Suitable units in the altimeter which ordinarily include a heterodyne detector determine the instantaneous frequency difference of the signals just mentioned and derive from that difference information continuously representative of the distance between the altimeter and ground.

Such altimeters have proved to be particularly useful on aircraft as an aid in making a safe landing. It has been observed, however, that under some operating conditions such as when the transmitters of the altimeters have a low power output, the altimeters have not been as accurate as may be desireed. Heretofore, the cause of this inaccuracy has not been entirely understood and it has been customary to tolerate the inaccuracy.

In a representative form of such an altimeter, the transmitter thereof employs a klystron which may operate at a mean frequency of about 4,300 megacycles and is swept over a range of frequencies such as 40 megacycles at an audio-frequency rate of approximately 1,000 cycles per second. When an aircraft employing such an altimeter is at a substantial height, for example at an altitude of about 200 feet when on its glide path prior to touchdown with the runway, it has been observed that the altimeter supplies information which is somewhat in error. When the aircraft is at lower altitudes, however, such as 15 to 50 feet immediately prior to touchdown, the altimeter supplies accurate altimeter information.

Applicants have established that the error mentioned above is caused by undesired low-frequency interference signals occurring within the pass band of the beat-frequency signal derived by the heterodyning devices mentioned above. One cause of the interference signals has been determined to be the 1,000-cycle per second signal which is introduced into the signal output of the heterodyne detector as a result of the sweeping or frequency-modulation of the klystron at the 1,000-cycle rate. Another source of the interference signals is the klystron which has the characteristic of producing considerable undesired low-frequency amplitude modulation as it is frequency-modulated over a range of frequencies, which low-frequency signals ordinarily cannot be completely balanced out and, therefore, appear in the output circuit of the heterodyne detector as interference signals that impair the accuracy of the devices utilizing the derived heterodyne signal to develop an indication of altitude. Another source of the interference signals is the non-linear signal-translating characteristic of the heterodyning devices. For example, when the sweep frequency of the klystron is approximately 1,000 cycles, interference signals occupying a band of frequencies above 2,000 cycles are developed because of the above-mentioned characteristic of the klystron and the non-linear signal-translating characteristic of the heterodyning devices.

The interference signals just mentioned are also present when the aircraft employing such an altimeter is flying at low levels from about 15 to 50 feet. However, the desired reflected wave signals or echoes received under such conditions from the ground are strong because of the short distance between the aircraft and ground. As a result, the desired beat-frequency signals derived from the reflected wave signals are substantially stronger than the interference signals so that the latter do not significantly affect the accuracy of the altimeter. However, at the higher altitude levels mentioned above, the strength of the reflected signals is substantially less because of the longer paths between the aircraft and ground and between the ground and the altimeter. Since the beat-frequency information and the interference signals occupy the same pass band, those units of the altimeter which respond to the beat-frequency information unfortunately respond to the interference signals and produce an altitude indication which is somewhat in error.

It is an object of the invention, therefore, to provide a new and improved distance-measuring apparatus which avoids one or more of the above-mentioned disadvantages or limitations of prior such apparatus.

It is also an object of the invention to provide a new and improved distance-measuring apparatus which is simple in construction, relatively inexpensive to manufacture, and yet provides accurate and reliable altitude information.

It is a further object of the invention to provide a new and improved frequency-modulation altimeter which is particularly useful on an aircraft when the latter is following its glide path in making a landing just prior to touchdown.

It is an additionel object of the invention to provide a new and improved frequency-modulation altimeter which provides accurate altitude indications even though the transmitter of the altimeter has a low power output which may be a fraction of 1 watt.

In accordance with a particular form of the invention, a distance-measuring apparatus comprises means for radiating a wave signal recurrently swept over a range of frequencies and for receiving in response thereto from a remote object a related frequency-modulated wave signal. The apparatus also includes circuit means responsive to the radiated and received signals which derives undesired interference signals related at least to the frequency of said recurrent sweeping while deriving desired information representative of the distance between the radiating means and the aforesaid object. The distance-measuring apparatus further includes means responsive to the aforesaid signals and the aforesaid information for deriving a control potential representative of the strength of the received signal. The apparatus still further includes control means responsive to the interference signals and the aforesaid information and including an output circuit for deriving therein a control effect which is representative of the distance but tends to be somewhat inaccurate because of the interference signals. The apparatus additionally includes signal-translating means coupled between the aforesaid circuit means and the control means for applying to the latter at least the information and including a resonant trap circuit responsive to the interference signals for removing at least some of those interference signals from the aforesaid output circuit, thereby to increase the accuracy of the above-mentioned control effect. The apparatus also includes a control circuit coupled to the aforesaid trap circuit and responsive to the above-mentioned control potential when it is representative of a received signal of low strength for maintaining the trap circuit in a condition to remove at least some of the interference signals from the above-mentioned output circuit until the strength of the received signal substantially increases.

For a better understanding of the present invention, together with other and further objects thereof, reference is had to the following description taken in connection with the accompanying drawings, and its scope will be pointed out in the appended claims.

Figure 2:
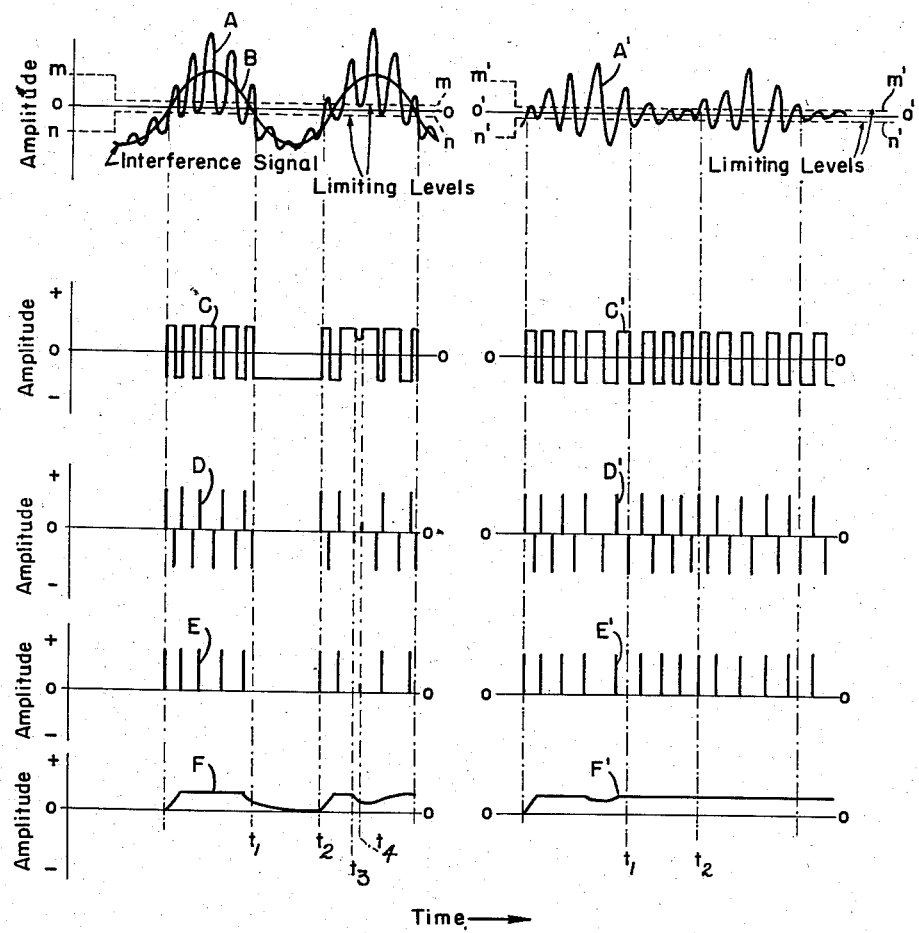

Referring to the drawings:

Fig. 1 is a circuit diagram, partly schematic, of a complete distance-measuring apparatus in the form of an altimeter in accordance with a particular form of the invention, and Fig. 2 is a series of curves utilized in explaining the operation of the apparatus of Fig. 1.

*Description of Fig. 1 distance-measuring apparatus*

Referring now more particularly to Fig. 1 of the drawings, there is represented means suitable for use on an aircraft for radiating a wave signal recurrently swept over a range of frequencies and for receiving in response thereto from a remote object, such as the ground, a related frequency-modulated wave signal. This means comprises a transmitter 10, preferably in the form of a velocity-modulated oscillator such as a reflex klystron oscillator, which may have a conventional automatic-frequency-control system (not shown) for stabilizing the mean operating frequency thereof. The repeller electrode of the oscillator of the transmitter is connected to a sweep generator 11 which is effective to sweep the frequency of the transmitted signal over a range of frequencies at a suitable rate, such as about 1,000 cycles. A sweep frequency of the order of the one just mentioned is desirable since a lower sweep frequency, such as one in the vicinity of several hundred cycles, results in the distance-measuring apparatus being susceptible to undesired Doppler interference from targets which reflect a strong wave signal. The output circuit of the transmitter 10 is connected to its directive antenna or radiating system 13 through a delay device 12 which may comprise a suitable length of transmission line. The delay device 12 is desirable to improve the performance or accuracy of the altimeter at very low altitudes and may, for example, be selected to impart a fixed system delay in the round-trip propagation time between the transmitter 10 and the receiver of the altimeter corresponding to 6 feet of altitude, thus raising the frequency of the received signal by the amount imparted by 6 feet of altitude.

A directive antenna system 14, which is coupled to a crystal mixer or frequency converter 15, is employed to receive a frequency-modulated wave signal or echo reflected from the ground in response to the transmitted frequency-modulated wave signal. The frequency converter 15 has an input circuit coupled to the transmitter 10 and constitutes circuit means which has a nonlinear signal-translating characteristic and which is responsive to the radiated and received signals and inherently derives undesired interference signals while deriving desired beat-frequency information representative of the distance between the altimeter and ground. The output circuit of the frequency converter 15 includes a suitable filter network having a pass band in the audio-frequency range for deriving the beat-frequency signal or information which is the heterodyne difference between that applied to its input circuits by way of the transmitter 10 and the antenna system 14. The undesired interference signals and the manner in which they are generated will be explained subsequently.

Connected to the output circuit of the frequency converter 15 is a signal-translating channel including, in cascade, a plurality of repeaters preferably comprising a first audio-frequency amplifier 16, a second audio-frequency amplifier 17 of conventional construction which may include one or more stages of amplification, and a third signal-translating means or audio-frequency amplifier 18. For a purpose to be explained subsequently, amplifier 16 preferably has a nonuniform frequency-response characteristic whereby it is degenerative with respect to low-frequency signals applied thereto by way of the frequency converter 15 that include the undesirable signals mentioned above but favors the translation of the higher frequency applied signals including some of the desired beat-frequency information. To this end, the amplifier 16 comprises a tube 30 including in its circuit a cathode resistor 31 having a large resistance for causing degeneration of low audio-frequency components such as those up to about 2,000 cycles. Connected in shunt with this resistor is a by-pass condenser 32 which presents a relatively low impedance to high-frequency components of the applied beat-frequency information so that the amplifier 16 translates the last-mentioned components with greater gain than it does the low-frequency components. The signal-translating means or audio-frequency amplifier 18 will be described in detail subsequently.

The distance-measuring apparatus also includes control means 19 responsive to the undesired interference signals and the desired beat-frequency information developed in the output circuit of the frequency converter 15 and preferably includes, in cascade, an amplifier and symmetrical limiter 20, a differentiating circuit 21, and an asymmetrical limiter and integrator 22 for deriving in the output circuit of the integrator a unidirectional control effect which is representative of the altitude of the aircraft but tends to be somewhat inaccurate at higher altitudes because of the interference signals. The input circuit of the amplifier and limiter 20 is connected to a pair of terminals 33, 33 in the output circuit of the amplifier 18 while the output terminals of the limiter and integrator 22 are preferably connected to a direct-current meter 23 which is calibrated in feet to provide a correct indication of altitude. The meter is so calibrated as to compensate for the presence of the delay device 12.

The distance-measuring apparatus additionally includes a signal-translating means in the form of the amplifier 18 which is coupled between the circuit means or frequency converter 15, via the amplifiers 16 and 17, and the control means or unit 19 for applying to the latter at least the aforesaid desired information. This signal-translating means also includes selector means 24 responsive to the interference signals and to the magnitude of the unidirectional control effect derived in the output circuit of the limiter and integrator 22 for removing at least some of the interference signals from the output circuit of unit 22, thereby to increase the accuracy of the derived control effect or unidirectional potential and hence the accuracy of the altitude indication supplied by the meter 23. The amplifier 18 comprises a pentode 34 having its control electrode-cathode input circuit coupled to the output circuit of the amplifier 17 through a coupling condenser 35 and a grid-leak resistor 36. The anode of tube 34 is connected to a source of potential +B through an anode load resistor 37 while its screen electrode is connected to ground through a by-pass condenser 38 which is connected to the source just mentioned through a resistor 39. The suppressor electrode is grounded and the cathode is connected to ground through a resistor 29. The selector means 24 is coupled between the control electrode of tube 34 and ground and includes a series-resonant circuit or trap comprising a condenser 40 and an inductor 41 in cascade with a switching device preferably in the form of a crystal diode 42. The trap just mentioned is preferably designed to be resonant at a frequency related to the undesired interference signal and may be resonant at a frequency of about 2,000 cycles or twice that of the sweep frequency of the generator 11. The junction of the inductor 41 and the diode 42 is connected to the ungrounded output terminal of the limiter and integrator 22 through series-connected resistors 43 and 44 and an input terminal 45. The junction of the resistors 43 and 44 is connected to ground through a by-pass condenser 46 and is also connected through a resistor 47 to an input terminal 48.

An automatic-gain-control detector 25, which is coupled between the output terminals 33, 33 of the amplifier 18 and an input terminal of amplifier 17 connected to one or more gain-control circuits of that amplifier, constitutes a means responsive to the signal output of the amplifier 18 for deriving an automatic-gain-control potential which is representative of the strength of the frequency-modulated wave signal intercepted by the antenna system 14 for application to the amplifier 17 to regulate the gain thereof. The output circuit of the automatic-gain-control detector 25 is also connected to a pair of input terminals 49, 49 of a relay circuit 26 which constitutes a control circuit that is coupled to the switching means or crystal diode 42, in a manner to be described subsequently, and is responsive to the automatic-gain-control potential when the latter is representative of a received signal of low intensity for maintaining the series-resonant circuit 40, 41 in a condition to remove at least some of the interference signals from the output circuit of amplifier 18 until the intensity of the wave signal substantially increases. The relay circuit 26 includes a pair of control tubes 50 and 51 having grounded cathodes and having anodes which are connected through a relay winding 52 and a resistor 54 to a source of potential +B. The winding 52 has an armature 53 for controlling a movable switch blade 55 normally engaging a switch point connected to a source indicated as —B' which may develop —30 volts. Winding 52 is also arranged so that when it is energized it causes the switch blade to engage the terminal connected to the source indicated +B' which may develop +55 volts. Switch blade 55 is connected through a pair of terminals 56, 56 to the input terminal 48 of amplifier 18 while the control electrode of tube 50 is connected through a resistor 57 and a pair of terminals 58, 58 to the other input terminal 45 of amplifier 18. The control electrode of tube 50 is also connected through a resistor 59 to a biasing source —B'' which may develop a potential of about —150 volts while the control electrode of tube 51 is connected to the input terminals 49, 49 of relay circuit 26.

*Operation of Fig. 1 distance-measuring apparatus*

In the initial consideration of the operation of the distance-measuring apparatus or altimeter of Fig. 1, it will first be assumed that the selector means 24 is not coupled to the signal-translating channel between the frequency converter 15 and the control means 19 and that the relay circuit 26 is not connected between the AGC detector 25 and the input terminal 45 of the signal-translating means 18. It will also be assumed that the amplifier 16 is not proportioned to favor the translation of high-frequency information in the audio-frequency range. The sweep generator 11 applies a sweep signal to the transmitter 10 causing the output signal of the latter automatically to sweep in repetitive cycles over a range of frequencies at a predetermined rate corresponding to the sweep frequency of generator 11. For example, in accordance with a useful embodiment of the invention, the transmitter operates at a mean frequency of about 4,300 megacycles and is swept over a 40-megacycle range at a 1,000-cycle rate by the generator 11. The frequency-modulated output signal of the transmitter 10 undergoes a predetermined time delay in unit 12 and is then directed at the ground by the antenna system 13. In response to the transmitted wave signal, there appears at the receiving antenna system 14 a reflected wave signal or echo for application to the frequency converter 15. Because of the continuous change in frequency caused by the sweeping operation described above and also the round-trip propagation time between the altimeter and ground, at a given instant the frequency of the received wave signal or echo is different from that of the transmitted wave signal although the wave form is the same. As is well understood, the frequency-difference information derived in the output circuit of the frequency converter 15, as a result of the heterodyning of the transmitted wave signal from transmitter 10 and the received wave signal supplied by antenna 14, is directly proportional to the height of the aircraft and the intensity of that information is inversely proportional to the altitude of that craft.

In addition to deriving the desired beat-frequency information, the signal output of the frequency converter 15 also includes undesired interference signals. One of these is a 1,000-cycle signal which is developed by the sweep generator 11 and is translated by the audio-frequency filter network in the converter 15 to its output circuit. Another interference signal is produced when the frequency of the output signal of a velocity-modulation oscillator, such as a klystron, is swept over a range of frequencies. It is a well-known characteristic of a klystron that as its frequency is swept about the center frequency of its mode of operation, its output power varies from a maximum at its center frequency and falls off on either side thereof. This power variation results in an undesired amplitude modulation which is delivered to the frequency converter 15 and appears in the output circuit of the latter as a signal having a strong frequency component at twice the sweep frequency and other components which may extend as high as 15 kilocycles.

In order to understand the shortcomings of prior frequency-modulation altimeters which do not include devices such as the selector means 24 and its other associated units such as the AGC detector 25 and the relay circuit 26 for controlling the operation of the selector means 24, reference is made to curves A–F, inclusive, of Fig. 2 of the drawings. Curve A represents a portion of the desired beat-frequency information appearing in the output circuit of the frequency converter 15 and undulates about and hence is shown superimposed on a portion of an undesired interference signal of the type which is under consideration and is represented by curve B. For simplicity of representation and explanation, this interference signal has been represented as a simple sine wave although it will be understood that it may be a complex wave or waves. The output signals of the frequency converter are translated by the signal-translating channel including amplifiers 16, 17, and 18 (assuming now unit 16 is a conventional amplifier) and appear at the output terminals 33, 33 of the amplifier 18 as amplified signals having the wave forms represented by curves A and B of Fig. 2. The AGC detector 25 utilizes these output signals to derive a control effect for controlling the gain of amplifier 18. The output signal of amplifier 18 is also applied to the amplifier and limiter 20. The limiter of unit 20 is a symmetrical limiter and limits the applied alternating signals at the upper amplitude level $m$—$m$ and the lower amplitude level $n$—$n$ as represented near curves A and B of Fig. 2. The symmetrically limited signal is amplified and appears at the output terminals of unit 20 as a rectangular wave or pulse-type signal fluctuating about its O—O axis as represented by curve C. The durations of the individual pulses of curve C are proportional to the instantaneous frequency of the heterodyne difference signal appearing in the output circuit of the frequency converter 15. It will be observed from curve C that during the interval $t_1$—$t_2$ no pulses are present although curve A shows desired beat-frequency information of low amplitude superimposed on the undesired interference signal which, at the interval under consideration, is undergoing a negative polarity swing. It will be understood that this negative polarity swing depresses the desired information of curve A occurring during the interval $t_1$—$t_2$ below the lower cutoff level of the limiter of unit 20 so that some of the desired information is unfortunately eliminated from the output circuit of unit 20.

In the well-known manner, the signal of curve C is differentiated by the differentiating circuit 21 to develop in its output circuit for application to the limiter and integrator 22 the signal represented by curve D. It will be observed in curve D at times $t_3$ and $t_4$ the pulses are of extremely low amplitude with relation to the uniform amplitude pulses appearing during the other portions of the curve. Since the unit 22 includes an asymmetrical limiter, it utilizes only the positive-going portions of the applied signal and derives the signal of curve E for application to the integrating network of that unit. It will be observed that the signal applied to the integrator comprises a pluraliy of constant amplitude pulses and one extremely low amplitude pulse appearing at time $t_4$. Unit 22 develops in its output circuit for application to the direct-current meter 23 a control effect or potential having a wave form similar to that represented by curve F. It will be seen that the unidirectional signal of curve F has an amplitude which varies and that this amplitude approaches and reaches the zero amplitude level during the interval $t_1$—$t_2$ and also has a reduced amplitude in the vicinity of time $t_4$. This is because the output signal of the integrator of unit 22 depends on both the number of and the amplitude of the pulses developed in the output circuit of the limiter of that unit. Because of the presence of the undesired interference signal of curve B of Fig. 2, the units 20, 21, and 22 are not effective to derive, in the output circuit of the limiter and integrator 22, a control effect which is accurately representative of the desired beat-frequency signal of curve A and, hence, representative also of the altitude of the aircraft, since information occurring at time $t_1$—$t_2$ and time $t_4$ is effectively lost.

As previously mentioned, the intensity of the signal received by the antenna 14 of the altimeter is directly proportional to the altitude of the aircraft employing the altimeter. Thus at fairly high altitudes, for example, when an aircraft is at a height of about 200 feet and is on its glide path making a landing, the received signal is of rather low intensity and this intensity, in relation to the strength of the undesired interference signal appearing in the output circuit of the frequency converter, is quite low. Consequently, when the aircraft employing the altimeter is at a relatively high altitude, such as that just mentioned, a desired beat-frequency signal, such as that represented by curve A, will be superimposed on and thus undulate about a signal of large amplitude comparable to that of curve D. Thus at the higher amplitude just mentioned, the control effect applied to the direct-current meter 23 will not be accurately representative of the beat-frequency information and hence will not cause the meter to provide an accurate indication of altitude. At low-altitude levels, however, the intensity of the beat-frequency information is large with relation to the interference signal and the units 20, 21, and 22 of control means 19 will derive a control effect which is quite accurately representative of the altitude of the aircraft. From the foregoing considerations, it will be seen that there exists a need for more accurate altitude information when the frequency-modulation altimeter is on an aircraft appearing at higher altitude levels.

It will be assumed now that the selector means 24 including the series-resonant trap 40, 41 and the crystal diode 42 is operatively connected in circuit with the amplifier 18. To simplify the explanation and to aid the understanding of the operation of the distance-measuring apparatus in accordance with the present invention, it will first be assumed that the relay circuit 26 is not present but that the source —B' is effective to apply about —30 volts to the terminal 48. For the condition assumed above, the output circuit of the limiter and integrator 22 is connected to the terminal 45 although, with the assumed absence of circuit 26, no connection exists between terminal 58 and terminal 45. It will further be assumed that the aircraft employing the altimeter is at an altitude of about 200 feet as it is following its glide path just prior to making a touchdown landing. Under such conditions, the frequency of the beat-frequency signal developed in the output circuit of the frequency converter 15 is quite large and there appears in the output circuit of the limiter and integrator 22 a control effect having a positive potential of about 55 volts which is effective to overcome the negative potential of about —30 volts applied through terminal 48 to the positive electrode of the crystal diode 42. This positive potential renders the latter conductive and creates a low-impedance path for undesired interference signals through the series-resonant circuit 40, 41 between the control electrode of tube 34 and ground. Consequently, these undesired signals are effectively attenuated or substantially removed from the input circuit of tube 34 and the output signal of unit 18 applied to the amplifier and limiter 20 has the wave form represented by curve A' of Fig. 2.

It will be observed that the desired beat-frequency information represented by curve A' does not fluctuate about an interference signal such as that represented by curve B in the adjacent graph. Since the signal of curve A' varies in amplitude only about its O—O axis, after amplification and symmetrical limiting in unit 20, there is derived a potential of rectangular wave form which varies about a O—O axis as represented by curve C'. The rectangular wave of curve C' consists of positive-going and negative-going pulses having constant amplitudes and having durations which are proportional to the instantaneous frequency of the beat-frequency signal derived by the frequency converter 15. Differentiating circuit 21 utilizes the signal of curve C' and derives a series of positive-going and negative-going pulses as represented in curve D'. The asymmetrical limiter of unit 22 clips the positive-going pulses of curve D' and develops for application to the integrator of unit 22 the positive polarity pulses represented in curve E'. The output potential of the integrator has a wave form represented by curve F'. It will be seen from curve E' that the pulses applied to the integrator of unit 22 are of constant amplitude and have equal energy increments. The charge developed across the condenser of the integrator of unit 22, therefore, depends only on the number of pulses applied thereto and not on both the number of pulses and the amplitude thereof as for the condition explained above in connection with curves E and F of Fig. 2. Consequently, the potential of curve F' derived by the limiter and integrator 22 for the operating condition under consideration accurately represents the frequency variations in the output signal of the frequency converter 15 and, therefore, enables the meter 23 to provide a reliable indication of altitude when the aircraft is at an altitude of about 200 feet when it is following its glide path prior to making a touchdown landing.

When the aircraft has proceeded along its glide path from the higher altitude of about 200 feet to approximately a height of 50 feet, the frequency of the desired information appearing at the output circuit of the frequency converter 15 has materially decreased because of the shorter round-trip propagation time between the antenna systems 13 and 14 of the altimeter. Consequently, the unidirectional output potential derived in the output circuit of the limiter and integrator 22 for application to the input terminal 45 of the selector means 24 has decreased to a value which is less than the —30-volt potential supplied to terminal 48 from the source —B' for application to the anode of the crystal diode 42. Consequently, the negative potential supplied by terminal 48 renders the diode 42 nonconductive, thereby presenting a high impedance between the series-resonant circuit 40, 41 and ground. As a result, undesired low-frequency signals related to the sweep frequency of generator 11 and the inherent amplitude modulation produced by the velocity-modulation oscillator or klystron of transmitter 10, as it is swept over its frequency range, are not attenuated in the input circuit of the amplifier 18. Consequently, the wave form of the signal applied by amplifier 18 to the input circuit of the amplifier and limiter 20 resembles that represented by curves A and B of Fig. 2. Although the undesired interference signal of curve B is present in the input circuit of unit 20, the amplitude of the desired beat-frequency signal is large because the intensity of the received wave signal or echo applied to the antenna system 14 is, in turn, large because of the very short propagation path between the transmitting antenna system 13 and the receiving antenna system 14. Accordingly, the ratio of the desired signal or beat-frequency information to the undesired interference signal in the input circuit of the amplifier and limiter 20 is large.

Because of this large ratio the interference signal does not depress all the desired beat-frequency information occurring during an interval such as $t_1$—$t_2$ below the lower or limiting level of the limiter of unit 20. Consequently, the output signal of the limiter and integrator 22 and the indication provided on the meter 23 are accurately representative of the altitude of the aircraft when it is at a height of about 50 feet or less. Since low-frequency information predominates in the output circuit of the frequency converter 15 when the aircraft is at an altitude of about 50 feet or less, it is desirable that the series-resonant trap 40, 41 be effectively disabled when the aircraft is at such a height in order that the necessary low-frequency information will be translated to the control means 19. Thus, the selector means 24 and its associated circuits are effective to develop an accurate representation of altitude when the aircraft is at a relatively high altitude or a low altitude.

It will now be assumed that the relay circuit 26 is connected in operative relationship in the altimeter and it will be further assumed that the aircraft is flying at an altitude which is above 200 feet. It will be appreciated that when the altimeter is a relatively low power device developing power output which may be less than 1 watt, the intensity of the received signal or echo from the ground may be quite weak. Under such an operating condition the strength of the received signal may be too weak to assure a reliable indication on the meter 23 and, hence, the utility of the altimeter will be somewhat reduced. The purpose of the relay circuit 26 is to assure a useful reading on the meter 23 despite the fact that the aircraft is flying at a high altitude level such as one above 200 feet.

At high altitude levels the automatic-gain-control detector 25 develops a control potential which ordinarily is less negative than that developed when the aircraft is flying at a low level. Consequently, for the flying condition presently under consideration, the less negative control potential developed by unit 25 for application through terminals 49, 49 to the control electrode of tube 51 is such that the latter becomes conductive, thereby causing a flow of anode current through the resistor 54 and the winding 52. This, in turn, magnetizes the armature 53, and switch blade 55 is actuated by the latter in a sense to engage the switch contact connected to the source +B' which develops a potential of about +55 volts. As a result, this relatively high positive potential is applied through terminals 56, 56, terminal 48, and resistors 47 and 43 to the anode of the crystal diode 42, thereby rendering it conductive. For the condition under consideration, the positive voltage applied to the terminal 48 is greater than any applied to the terminal 45 from a path including the output circuit of the limiter and integrator 22 and the resistors 57 and 59 connected to the source —B". The low-impedance path presented by the trap circuit 40, 41 and the conductive diode 42 to undesired low-frequency signals attenuates those signals and enables the meter 23 to develop from the high-frequency information translated by amplifier 18 to the input circuit of control means 19 an indication on meter 23 which is representative of altitude and which otherwise would not be obtained without the selector means 24. Thus, when the altimeter employs a transmitter with a low power output, the selector means effectively increases the range of the altimeter.

It is possible, under some operating or atmospheric conditions, that the signal output of the AGC detector 25 and the limiter and integrator 22 be rather large even though the aircraft is flying at an altitude above 200 feet. Under such a condition, a relatively large negative potential is developed for application to the control electrode of tube 51, thereby assuring that it remains nonconductive. At the same time, there is derived a substantially positive potential at the output circuit of the limiter and integrator 22 for application to the terminal 45 associated with the selector means 24. In that case, the positive potential appearing in the output circuit of the limiter 22 is also applied through the resistor 57 to the control electrode of tube 50 and overcomes the negative bias supplied by the source —B". This causes the tube 50 to become conductive, thereby energizing the winding 52 and operating the switch blade 55 in a sense to connect the source +B' through the switch blade and the resistors 47 and 43 to the positive terminal of the crystal diode 42. This, in turn, enables the shunt path connected across the input circuit of tube 34 and effectively attenuates undesired interference signals so that the meter 23 develops a useful altitude indication. It will, therefore, be seen that when the aircraft is at an altitude above 200 feet it will always have a suitable positive potential on the anode of the crystal diode 42. In other words, when the aircraft is flying at an altitude above 200 feet, the relay circuit 26 assures that the crystal diode 42 is conductive, thereby rendering effective the trap circuit 40, 41 regardless of the intensity of the received signal.

Assume now that the aircraft has dropped to a level below 50 feet. The amplitude of the negative polarity control potential developed in the output circuit of the AGC detector 25 is now ordinarily relatively large so that it biases the tube 51 to anode-current cutoff. Winding 52 is de-energized and the switch blade 55 is returned to the position represented in Fig. 1 of the drawings wherein —30 volts from the source —B' are applied through terminals 56, 56, terminal 48, and resistors 47 and 43 to the anode of the crystal diode 42. The diode is rendered nonconductive so that the trap circuit no longer is connected in shunt with the input circuit of the tube 34. The altimeter then operates as has been described above. Under some operating conditions the received wave signal or echo may momentarily be of substantially zero intensity even though the aircraft is at an altitude less than 50 feet. Under such a condition, the less positive potential applied to the control electrode of tube 51 would permit it to become conductive, thereby applying a positive potential to the terminal 48 associated with the selector means 24. For the assumed condition, however, the output potential of the limiter and integrator 22 would be very low and the source —B" would apply through resistors 59 and 57 to the terminal 45 a negative potential which would maintain the anode of the crystal diode 42 at a negative value despite the positive potential applied to the terminal 48 from the source +B'. Accordingly, the trap circuit 40, 41 would be ineffective to attenuate any low-frequency signals and information applied to the amplifier 18 so that when an echo was again picked up by the receiver antenna system 14, the altimeter would be in a position to derive an accurate indication of the altitude of the craft.

The above explanations have neglected the operation of the amplifier 16 which is designed to favor the translation of high-frequency components of the applied signal. This amplifier augments the action of selector 24 and relay circuit 26 by providing greater gain to high-frequency portions of the beat-frequency information, which information ordinarily has its greatest frequency and least intensity when the aircraft is flying at higher altitudes.

While applicants do not intend to be limited to any particular constants for the embodiment of the invention described, there follows a partial list of circuit constants which have been found to be particularly suitable in the embodiment of the invention represented in Fig. 1:

| | |
|---|---|
| Resistor 29 | 150 ohms. |
| Resistor 36 | 100 kilohms. |
| Resistor 37 | 104.7 kilohms. |
| Resistor 39 | 220 kilohms. |
| Resistor 43 | 510 kilohms. |
| Resistor 44 | 820 kilohms. |
| Resistor 47 | 1 megohm. |
| Condenser 35 | 1500 micromicrofarads. |
| Condensers 38, 40 | 0.01 microfarad. |
| Condenser 46 | 0.1 microfarad. |
| Inductor 41 | 45 millihenries. |
| Tube 34 | Type 5702. |
| Diode 42 | 1N137 Crystal. |
| +B | +300 volts. |
| +B' | +55 volts. |
| —B' | —30 volts. |
| —B" | —150 volts. |

Transmitter 10 is a 2K56 reflex klystron delivering about 35 milliwatts of power at about 4300 mc. when swept over a 40-mc. range at a rate of about 1050 cycles/sec.

Trap 40, 41 is resonant at about 2100 cycles.

From the foregoing description it will be seen that a distance-measuring apparatus in accordance with the present invention is particularly useful as a frequency-modulation altimeter on an aircraft which is following its glide path in making a landing just prior to touchdown. It will also be clear that a distance-measuring apparatus involving the present invention is capable of providing an accurate altitude indication even though the transmitter of the altimeter employs an oscillator having a low power output. It will also be seen to one skilled in the art that a frequency-modulation altimeter in accordance with the present invention permits the use of a velocity-modulation oscillator which is characterized by its lightness in weight and the simplicity of the control circuits required to sweep the frequency of the output wave signal thereof over a substantial range of frequencies at a rate such that the altimeter is not susceptible to Doppler interference from nearby objects on the ground which reflect a strong signal.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A distance-measuring apparatus comprising: means for radiating a wave signal recurrently swept over a range of frequencies and for receiving in response thereto from a remote object a related frequency-modulated wave signal; circuit means responsive to said radiated and received signals which derives undesired interference signals related at least to the frequency of said recurrent sweeping while deriving desired information representative of the distance between said radiating means and said object; means responsive to said signals and said information for deriving a control potential representative of the strength of said received signal; control means responsive to said interference signals and said information and including an output circuit for deriving therein a control effect which is representative of said distance but tends to be somewhat inaccurate because of said interference signals; signal-translating means coupled between said circuit means and said control means for applying to the latter at least said information and including a resonant trap circuit responsive to said interference signals for removing at least some of said interference signals from said output circuit, thereby to increase the accuracy of said control effect; and a control circuit coupled to said trap circuit and responsive to said control potential when it is representative of a received signal of low strength for maintaining said trap circuit in a condition to remove at least some of said interference signals from said output circuit until the strength of said received signal substantially increases.

2. A distance-measuring apparatus comprising: means for radiating a wave signal recurrently swept over a range of frequencies and for receiving in response thereto from a remote object a related frequency-modulated wave signal; circuit means responsive to said radiated and received signals which derives undesired interference signals related at least to the frequency of said recurrent sweeping while deriving desired information representative of the distance between said radiating means and said object; means responsive to said signals and said information for deriving a control potential representative of the strength of said received signal; control means responsive to said interference signals and said information and including an output circuit for deriving therein a control effect which is representative of said distance but tends to be somewhat inaccurate because of said interference signals; signal-translating means coupled between said circuit means and said control means for applying to the latter at least said information and including in cascade a resonant selector and a switching device responsive to said interference signals and to said control effect for removing at least some of said interference signals from said output circuit, thereby to increase the accuracy of said control effect; and a control circuit coupled to said switching device and responsive to said control potential when it is representative of a received signal of low strength for maintaining said switching device in a condition to remove at least some of said interference signals from said output circuit until the strength of said received signal substantially increases.

3. A distance-measuring apparatus comprising: means for radiating a wave signal recurrently swept over a range of frequencies and for receiving in response thereto from a remote object a related frequency-modulated wave signal; circuit means responsive to said radiated and received signals which derives undesired interference signals substantially equal to a harmonic of the frequency of said recurrent sweeping while deriving desired information representative of the distance between said radiating means and said object; means responsive to said signals and said information for deriving a control potential representative of the strength of said received signal; control means responsive to said interference signals and said information and including an output circuit for deriving therein a control effect which is representative of said distance but tends to be somewhat inaccurate because of said interference signals; signal-translating means having an input circuit coupled to said circuit means and an output circuit coupled to said control means for applying to the latter at least said information and including selector means in said input circuit responsive to said interference signals for removing at least some of said interference signals from said output circuits, thereby to increase the accuracy of said control effect; and a control circuit coupled to said selector means and responsive to said control potential when it is representative of a received signal of low strength for maintaining said selector means in a condition to remove at least some of said interference signals from said output circuit until the strength of said received signal substantially increases.

4. A distance-measuring apparatus comprising: means for radiating a wave signal recurrently swept at an audio-frequency rate over a range of frequencies and for receiving in response thereto from a remote object a related frequency-modulated wave signal; circuit means responsive to said radiated and received signals which derives undesired interference signals having a relatively low audio frequency related at least to the frequency of said recurrent sweeping while deriving desired audio-frequency information representative of the distance between said radiating means and said object; means responsive to said signals and said information for deriving a control potential representative of the strength of said received signal; control means responsive to said interference signals and said information and including an output circuit for deriving therein a control effect which is representative of said distance but tends to be somewhat inaccurate because of said interference signals; an audio-frequency repeater coupled between said circuit means and said control means for applying to the latter at least said information and including selector means resonant at said relatively low audio frequency and responsive to said interference signals and to said control effect but substantially less responsive to at least some of said information for removing at least some of said interference signals from said output circuit, thereby to increase the accuracy of said control effect; and a control circuit coupled to said selector means and responsive to said control potential when it is representative of a received signal of low strength for maintaining said selector means in a condition to remove at least some of said interference signals from said output circuit until the strength of said received signal substantially increases.

5. A distance-measuring apparatus comprising: means for radiating a wave signal recurrently swept at an audio-frequency rate over a range of frequencies and for receiving in response thereto from a remote object a related frequency-modulated wave signal; circuit means responsive to said radiated and received signals which derives undesired interference signals within an audio-frequency band and related to said recurrent sweeping while deriving desired information in said band representative of the distance between said radiating means and said object; means responsive to said signals and said information for deriving a control potential representative of the strength of said received signal; control means responsive to said interference signals and said information and including an output circuit for deriving therein a control effect which is representative of said distance but tends to be somewhat inaccurate because of said interference signals; signal-translating means coupled between said circuit means and said control means for applying to the latter at least said information and including selector means resonant in said band at approximately the first harmonic of the frequency of said recurrent sweeping and responsive to said interference signals for removing at least some of said interference signals from said output circuit, thereby to increase the accuracy of said control effect; and a control circuit coupled to said selector means and responsive to said control potential when it is representative of a received signal of low strength for maintaining said selector means in a condition to remove at least some of said interference signals from said output circuit until the strength of said received signal substantially increases.

6. A distance-measuring apparatus comprising: means including a velocity-modulation oscillator for radiating a wave signal recurrently swept at an audio-frequency rate over a range of frequencies and for receiving in response thereto from a remote object a related frequency-modulated wave signal; circuit means responsive to said radiated and received signals which derives undesired interference signals within an audio-frequency band and related to said recurrent sweeping while deriving desired information in said band representative of the distance between said radiating means and said object; means responsive to said signals and said information for deriving a control potential representative of the strength of said received signal; control means responsive to said interference signals and said information and including an output circuit for deriving therein a control effect having a magnitude which is representative of said distance but tends to be somewhat inaccurate because of said interference signals; signal-translating means coupled between said circuit means and said control means for applying to the latter at least said information and including a trap circuit resonant in said band at a frequency related to said recurrent sweeping and responsive to said interference signals and coupled in cascade with a switching device responsive to the magnitude of said control effect for removing at least some of said interference signals from said output circuit, thereby to increase the accuracy of said control effect; and a control circuit coupled to said switching device and responsive to said control potential when it is representative of a received signal of low strength for maintaining said switching device in a condition to remove at least some of said interference signals from said output circuit until the strength of said received signal substantially increases.

7. A distance-measuring apparatus comprising: means including a velocity-modulation oscillator for radiating a wave signal recurrently swept at an audio-frequency rate over a range of frequencies and for receiving in response thereto from a remote object a related frequency-modulated wave signal; circuit means responsive to said radiated and received signals which derives undesired interference signals within an audio-frequency band and related to said recurrent sweeping while deriving desired information in said band representative of the distance between said radiating means and said object; a repeater coupled to said circuit means and having a nonuniform frequency-response characteristic whereby it is degenerative with respect to low-frequency signals including said undesired signals in said band but favoring translation of higher frequency signals including at least some of said desired information; means responsive to said signals and said information for deriving a control potential representative of the strength of said received signal; control means responsive to said repeated interference signals and said information and including an output circuit for deriving therein a control effect having a magnitude which is representative of said distance but tends to be somewhat inaccurate because of said interference signals; signal-translating means coupled between said repeater and said control means for applying to the latter at least said repeated information and including a trap circuit resonant in said band at a frequency related to said recurrent sweeping and responsive to said repeated interference signals and coupled in cascade with a switching device responsive to the magnitude of said control effect for removing at least some of said repeated interference signals from said output circuit, thereby to increase the accuracy of said control effect; and a control circuit coupled to said switching device and responsive to said control potential when it is representative of a received signal of low strength for maintaining said switching device in a condition to remove at least some of said interference signals from said output circuit until the strength of said received signal substantially increases.

8. A low power altimeter comprising: means including a velocity-modulation oscillator for radiating at the ground a wave signal recurrently swept over a range of frequencies and for receiving in response thereto from the ground a related frequency-modulated wave signal; circuit means responsive to said radiated and received signals which derives undesired interference signals related at least to the frequency of said recurrent sweeping while deriving desired information representative of the altitude of said radiating means; means responsive to said signals and said information for deriving a control potential representative of the strength of said received signal; control means responsive to said interference signals and said information and including an output circuit for deriving therein a control effect having a magnitude which is representative of said altitude but tends to be somewhat inaccurate at higher altitudes because of said interference signals; signal-translating means coupled between said circuit means and said control means for applying to the latter at least said information and including selector means responsive to said interference signals and to said control effect when it reaches a predetermined magnitude for removing at least some of said interference signals from said output circuit, thereby to increase the accuracy of said control effect at said higher altitudes; and a control circuit coupled to said selector means and responsive to said control potential when it is representative of a received signal of low strength for maintaining said selector means in a condition to remove at least some of said interference signals from said output circuit until the strength of said received signal substantially increases.

9. A low power altimeter comprising: means including a velocity-modulation oscillator for radiating at the ground a wave signal recurrently swept over a range of frequencies and for receiving in response thereto from the ground a related frequency-modulated wave signal; circuit means responsive to said radiated and received signals which derives undesired interference signals related at least to the frequency of said recurrent sweeping while deriving desired information representative of the altitude of said radiating means; means responsive to said signals and said information for deriving a control potential representative of the strength of said received signal; control means responsive to said interference signals and said information and including an output circuit for deriving therein a control effect having a magnitude varying directly with said altitude but tending to be somewhat inaccurate at higher altitudes because of said interference signals; signal-translating means coupled between said circuit means and said control means for applying to the latter at least said information and including selector means responsive to said interference signals in cascade with a switching device responsive to said control effect when it exceeds a predetermined magnitude for connecting said selector means in circuit to remove at least some of said interference signals from said output circuit, thereby to increase the accuracy of said control effect at said higher altitudes; and a control circuit coupled to said switching device and responsive to said control potential when it is representative of a received signal of low strength for maintaining said selector means in a condition to remove at least some of said interference signals from said output circuit until the strength of said received signal substantially increases.

10. In a frequency-modulation altimeter employing a heterodyne detector which derives a signal output including undesired interference signals related to the sweep frequency of the frequency-modulated transmitter of the altimeter and including desired information having a magnitude representative of altitude, a signal-translating means comprising: a signal-translating channel responsive to said signal output of the heterodyne detector for translating at least said desired information; means responsive to said signal output for deriving a control potential representative of the strength of said received signal; a cascade-connected circuit including a selector coupled to said channel and responsive to said interference signals and including a switching device effectively responsive to said desired information when it has a predetermined magnitude for connecting said selector in circuit and removing at least some of said interference signals from said channel; and a control circuit coupled to said switching device and responsive to said control potential when it is representative of a received signal of low strength for maintaining said switching device in a condition to remove at least some of said interference signals from said output circuit until the strength of said received signal substantially increases.

References Cited in the file of this patent

UNITED STATES PATENTS

| | | |
|---|---|---|
| 2,392,672 | Koch | Jan. 8, 1946 |
| 2,430,357 | Mercer | Nov. 4, 1947 |
| 2,743,361 | Bauman | Apr. 24, 1956 |
| 2,756,337 | Shanahan | July 24, 1956 |

FOREIGN PATENTS

| | | |
|---|---|---|
| 624,522 | Great Britain | June 10, 1949 |